United States Patent [19]
Bardoll

[11] Patent Number: 5,097,717
[45] Date of Patent: Mar. 24, 1992

[54] GEAR SHIFT TRANSMISSION FOR A MOTOR VEHICLE

[75] Inventor: Meinrad Bardoll, Weissach, Fed. Rep. of Germany

[73] Assignee: Dr. Ing. h.c.F. Porsche AG, Fed. Rep. of Germany

[21] Appl. No.: 508,171

[22] Filed: Apr. 12, 1990

[30] Foreign Application Priority Data

Apr. 21, 1989 [DE] Fed. Rep. of Germany ....... 3913091

[51] Int. Cl.$^5$ .................. F16H 3/091; F16H 3/087
[52] U.S. Cl. ..................................... 74/363; 74/606 R
[58] Field of Search .................. 74/331, 363, 606 R, 74/333

[56] References Cited

U.S. PATENT DOCUMENTS

| | | | |
|---|---|---|---|
| 3,403,568 | 10/1968 | Holcombe | 74/333 |
| 4,324,152 | 4/1982 | Oshima et al. | 74/606 R |
| 4,528,867 | 7/1985 | Semba et al. | 74/606 R |
| 4,539,865 | 9/1985 | Yoneda et al. | 74/606 R |

FOREIGN PATENT DOCUMENTS 3530017 2/1987 Fed. Rep. of Germany .
2516623 11/1982 France .

*Primary Examiner*—Dwight Diehl
*Attorney, Agent, or Firm*—Evenson, Wands, Edwards, Lenahan & McKeown

[57] ABSTRACT

A gear shift transmission for a motor vehicle has a transmission housing which comprises an axle housing, an intermediate plate and a housing bell. The input shaft and the output shaft of the gear shift transmission are supported in three places, specifically in a front bearing plate of the axle housing, in the intermediate plate, and in a rear bearing plate of the housing bell. The reverse gear and the lower forward gears are arranged in the axle housing, and the higher forward gears are arranged in the housing bell.

9 Claims, 1 Drawing Sheet

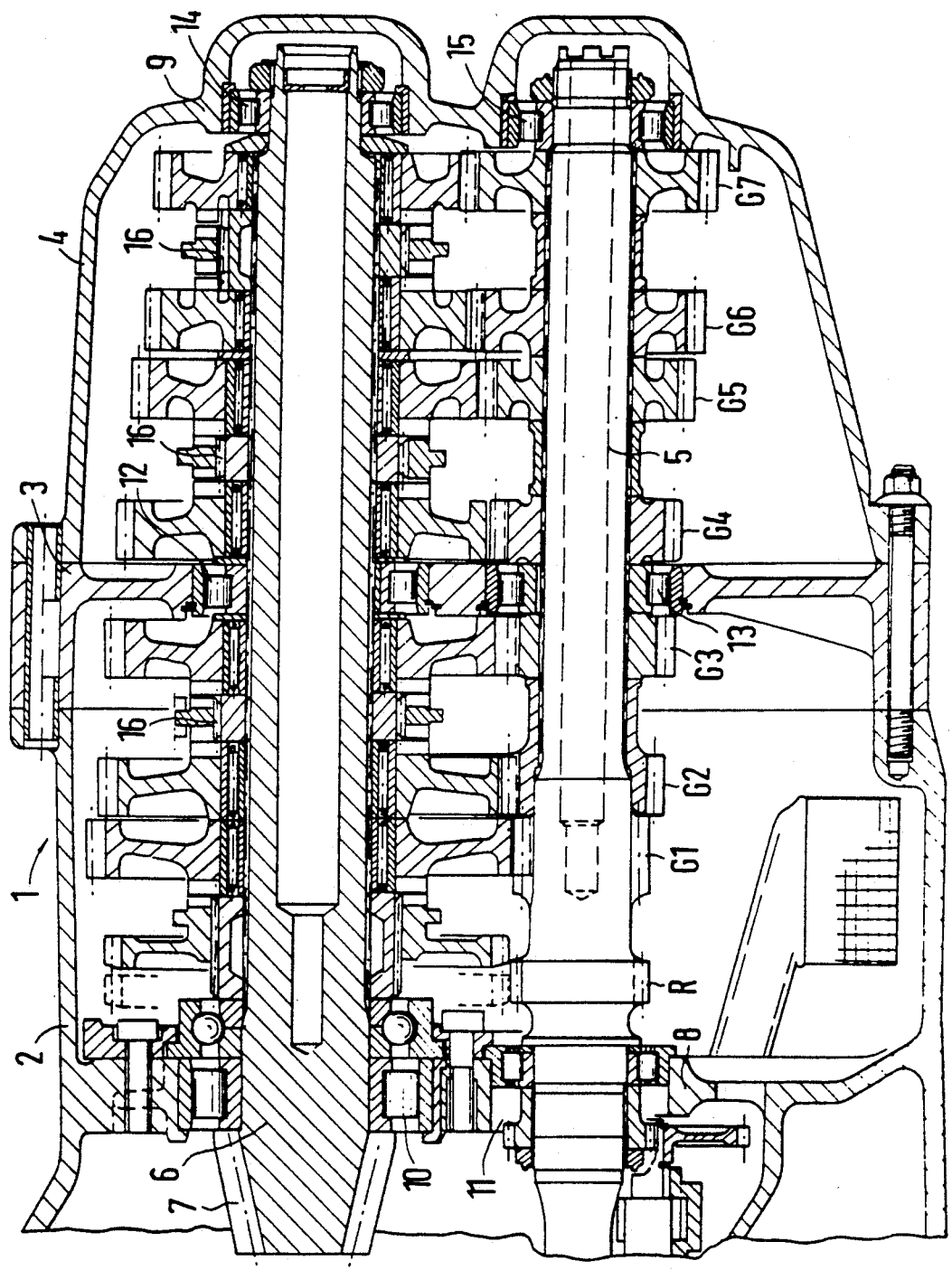

GEAR SHIFT TRANSMISSION FOR A MOTOR VEHICLE

BACKGROUND AND SUMMARY OF THE INVENTION

The invention relates to a gear shift transmission for a motor vehicle, particularly a racing car, having a transmission housing which includes an axle housing, an intermediate plate and housing bell flanged to the intermediate plate, and containing several forward gears and a reverse gear in such manner that transmission ratios can be adapted more easily to different vehicle and road courses.

A gear shift transmission of this general type shown in DE-OS 35 30 017 which includes an input shaft and an output shaft parallel to the input shaft. A transmission housing has three bearing plates for bearing of the input shaft and the output shaft, specifically a front bearing plate close to the axle, a center plate and a rear bearing plate. The input shaft comprises a center shaft and a hollow shaft which is both concentric to this center shaft and disposed on the center shaft close to the center plate. The second and fourth transmission gears are on one side of the center plate, whereas the first, third, fifth and reverse gears are on the other side of the center plate and between the center plate and the rear bearing plate.

It is an object of the invention to develop a gear shift transmission with a transmission housing of this general type such that optimal requirements can be met by adapting the transmission ratios with low mounting expenditures to different vehicles and road courses, particularly in the case of racing cars where each racing track requires a special adaptation of the number and ratios of the transmission gears which must often be carried out on site after preliminary testing.

The foregoing objects are achieved in accordance with the present invention by arranging the reverse gear and at least one low forward gear between the front bearing plate and the intermediate plate with the higher transmission gears arranged between the rear bearing plate and the intermediate plate. If the higher transmission gears in the housing bell are arranged between the rear bearing plate and the intermediate plate, the corresponding gear wheels will be easily exchangeable after the removal of the housing bell without having to remove the entire transmission. The reverse gear and the lower forward gears which do not have to be adapted to the respective race course will always remain in the axle housing.

BRIEF DESCRIPTION OF THE DRAWING

These and other features, objects and advantages will become more apparent from a detailed description of a presently preferred embodiment when taken in conjunction with the accompanying sole drawing figure which is a cross-sectional view of the gear shift transmission constructed in accordance with the principles of the present invention.

DETAILED DESCRIPTION OF THE DRAWING

A gear shift transmission is shown with seven synchronized forward gears (G1 to G7) and one reverse gear (R) is enclosed within a transmission housing designated generally by the numeral 1. The housing 1 comprises an axle housing 2, an intermediate plate 3 and a housing bell 4. The three housing parts 2, 3 and 4 are flanged together so as to join with one another with the housing bell 4 being removable and the parts therein easily accessible. An input shaft 5 driven by the vehicle engine (not shown) and an output shaft 7 which is parallel to the input shaft 5 and drives a vehicle axle through a bevel pinion 6 are disposed in the transmission housing 1. The input shaft 5 and the output shaft 7 are supported at three points in the transmission housing, namely in a front bearing plate 8 cast in the axle housing 2, in the intermediate plate 3, and in a rear bearing plate 9 forming the rear end wall of the housing bell 4. The front bearing plate 8 contains bearings 10 and 11, the intermediate bearing plate 3 contains bearings 12 and 13, and the rear bearing plate 9 contains bearings 14 and 15.

The reverse gear R is arranged directly following the front bearing plate 8. The reverse gear R is followed in sequence by the first gear G1, the second gear G2 and the third gear G3 constituting the lower forward gears. The higher forward gears comprised by the fourth gear G4, the fifth gear G5, the sixth gear G6 and the seventh gear G7 are disposed sequentially on the other side of the intermediate plate. The loose wheels of all the forward gears are disposed on the output shaft 7 and can be connected with it in a non-rotatable manner by way of conventional and schematically outlined synchronizing arrangements 16. The fixed wheels of all the forward gears are connected with the input shaft 5 by means of serrations or are directly milled onto it in a known manner.

While I have shown and described a presently preferred embodiment, it should be understood that the same is susceptible to some changes and modifications without departing from the scope of my invention. Therefore, I do not want to be limited to the details shown and described but intend to cover all changes and modifications encompassed by the scope of the appended claims.

I claim:

1. A motor vehicle gear shift transmission comprising an axle housing, an intermediate plate and a housing bell flanged to the intermediate plate forming a transmission housing, and several forward gears arranged on an input shaft and on an output shaft parallel to the input shaft within the transmission housing, each forward gear comprising a loose wheel and a fixed wheel, and a reverse gear also within the transmission housing, and the input shaft and the output shaft being disposed in a front bearing plate of the axle housing close to an axle of the motor vehicle, in the intermediate plate and in a rear bearing plate of the housing bell, wherein the reverse gear and at least one low gear of the forward gears having a low gear ratio are arranged between the front bearing plate and the intermediate plate, and higher gears having gear ratios higher than the low gear ratio of the low gear are arranged between the rear bearing plate and the intermediate plate;

wherein a first plurality of the forward gears having gear ratios below a threshold value is between the front bearing plate and the intermediate plate, and a second plurality of the forward gears having gear ratios above the threshold value is between the rear bearing plate and the intermediate plate.

2. The gear shift transmission according to claim 1, wherein the reverse gear is arranged to be directly adjacent the front bearing plate.

3. The gear shift transmission according to claim 1, wherein the rear bearing plate forms an end face of the housing bell.

4. The gear shift transmission according to claim 1, wherein the loose wheels of the forward gears are operatively arranged on the output shaft.

5. The gear shift transmission according to claim 1, wherein the reverse gear is arranged to be directly adjacent the front bearing plate.

6. The gear shift transmission according to claim 5, wherein the rear bearing plate forms an end face of the housing bell.

7. The gear shift transmission according to claim 6, wherein the loose wheels of the forward gears are operatively arranged on the output shaft.

8. The gear shift transmission according to claim 1, wherein the loose wheels of the forward gears are operatively arranged on the output shaft.

9. A motor vehicle gear shift transmission comprising an axle housing, an intermediate plate and a housing bell flanged to the intermediate plate forming a transmission housing, and several forward gears arranged on an input shaft and on an output shaft parallel to the input shaft within the transmission housing, each forward gear comprising a loose wheel and a fixed wheel, and a reverse gear also within the transmission housing, the input shaft being a unitary shaft having a substantially uniform diameter between the gears and the input shaft and the output shaft being disposed in a front bearing plate of the axle housing close to an axle of the motor vehicle, in the intermediate plate and in a rear bearing plate of the housing bell, wherein the reverse gear and at least one low gear of the forward gears having a low gear ratio are arranged between the front bearing plate and the intermediate plate, and higher gears having gear ratios higher than the low gear ratio of the low gear are arranged between the rear bearing plate and the intermediate plate.

* * * * *